Patented Oct. 31, 1922.

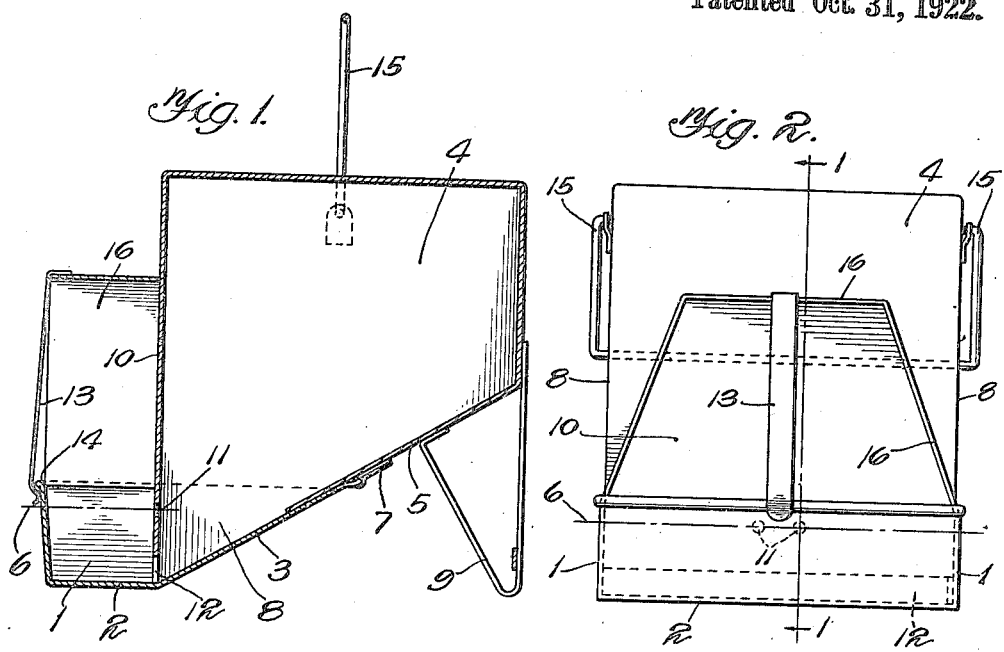
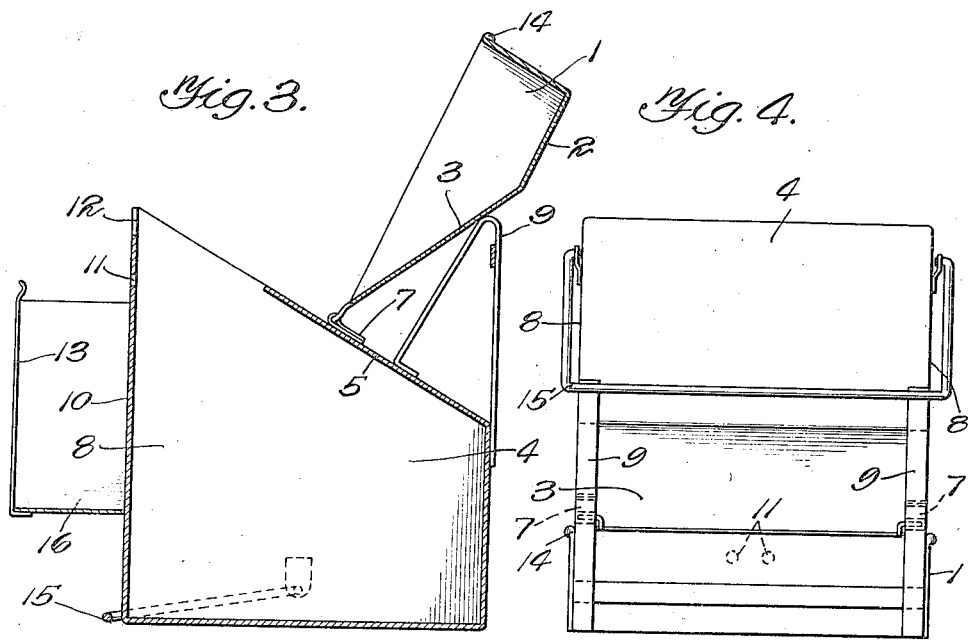

1,433,768

UNITED STATES PATENT OFFICE.

HENRY J. WILLEMS, OF KENOSHA, WISCONSIN.

DISPENSING DEVICE.

Application filed March 25, 1921. Serial No. 455,451.

*To all whom it may concern:*

Be it known that I, HENRY J. WILLEMS, citizen of the United States, residing at Kenosha, in the county of Kenosha and State of Wisconsin, have invented a certain new and useful Improvement in Dispensing Devices, of which the following is a full, clear, concise, and exact description.

My invention relates to dispensing devices and is of particular service when employed in feeding and watering devices for fowls and animals, though the invention is not to be limited to any particular use.

The device of my invention employs a container and a trough into which liquid may be discharged from the container under barometric control and is so constructed as to give wide access to its interior for the purpose of loading it with its contents.

The container overlies the rear portion of the trough and is imperforate above the level of the water or liquid that is to be maintained in the trough. The level to be maintained in the trough is desirably below the top of the trough and the imperforate front wall portion of the container extends to this level. The front wall of the container is desirably extended below the liquid level in the trough but is perforated at this point to establish this level.

The rear of the trough and the container are in hinged connection above the liquid level in the trough. In order to load the container, the entire structure is inverted to bring the trough uppermost, the trough then being turned back to uncover the now inverted bottom opening of the container. When the container has been filled the trough is lowered into its normal relation with the container, whereafter the entire structure is restored to its normal position.

The invention, in all of its characteristics, will be more fully described in connection with the accompanying drawing showing the preferred embodiment thereof and in which Fig. 1 is a sectional elevation on line 1—1 of Fig. 2; Fig. 2 is a front elevation; Fig. 3 is another sectional elevation but illustrating the structure inverted and with the trough swung back; and Fig. 4 is a rear elevation.

Like parts are indicated by similar characters of reference throughout the different figures.

The trough 1 has a front flat bottom wall portion 2 and a rear upwardly and rearwardly sloping bottom wall portion 3. The container 4 has a forwardly and downwardly sloping bottom wall portion 5 that overlaps the sloping trough bottom portion 3 and preferably terminates at the predetermined water level 6 that is to be maintained in the trough. The bottom portions 3 and 5 are preferably inclined at the same angle and serve to direct solid matter, if such is disposed within the container, into the trough. The invention is not to be limited, however, to the employment of such sloping bottoms. The trough bottom portion 3 and the container bottom portion 5 are in hinged connection above the water level 6 as indicated at 7. The side wall portions 8 of the container rest upon the portion 3 of the trough bottom whereby the trough takes part in supporting the structure in normal position. The legs 9 are secured to the rear of the trough and co-operate with the trough in supporting the structure.

The front wall portion 10 of the container is imperforate above the water level 6 as is also each other wall portion of the container to constitute a barometric feed. This wall portion is desirably also continued below the water level but is provided with openings 11 at the water level which is thereby defined. A wide gap 12 intervenes between the bottom edge of the front wall and the bottom of the trough through which the contents of the container may be freely passed into the trough, this wide gap being of particular service in conducting non-liquid matter into the trough that moves toward the trough along the sloping bottom walls 3 and 5. A spring clip 13 carried by the front wall 10 is engageable with the beaded edge 14 of the trough whereby the container is held from being swung back upon the hinge 7. A bail or handle 15 may be provided upon the container whereby the entire structure may be carried. A canopy 16 is desirably secured to the container front wall 10 and overlies the trough to keep out foreign matter, the clip 13 being preferably directly attached to the canopy. The fowls or animals have access to the trough in the space between it and the canopy.

When the container is to be filled with its contents, the entire structure is inverted and the trough is swung back until it rests against the legs 9 as shown in Fig. 3. The wide gap in the bottom of the container which is margined by the lower edge of the container bottom wall 5 is thus uncovered for the passage of the contents into the container. After the container is filled the trough is lowered and secured in place by the spring clip 13, whereafter the parts are restored to the normal or barometric feeding position indicated in Fig. 1.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the followings:—

1. The combination with a trough having a rear part of its bottom wall upwardly and rearwardly inclined; of a container having a downwardly and forwardly sloping bottom wall in movable connection with said sloping part of the bottom wall of the trough to permit change in the relative positions of the container and trough to permit loading of the container, the front wall of the container being between the front and rear of the trough and being imperforate above a liquid level to be maintained in the trough and extending below this liquid level and having an opening therethrough at this liquid level, there being a space between the bottom edge of this front wall and the bottom of the trough; and a leg at the rear of the container and serving as a support for the trough when the structure is inverted and the trough is placed in a container opening position.

2. The combination with a trough having a rear part of its bottom wall upwardly and rearwardly inclined; of a container having a downwardly and forwardly sloping bottom wall in movable connection with said sloping part of the bottom wall of the trough to permit change in the relative positions of the container and trough to permit loading of the container, the front wall of the container being between the front and rear of the trough and being imperforate above a liquid level to be maintained in the trough and extending below this liquid level and having an opening therethrough at this liquid level, there being a space between the bottom edge of this front wall and the bottom of the trough.

In witness whereof, I hereunto subscribe my name this 17th day of March A. D. 1921.

HENRY J. WILLEMS.